(12) United States Patent
Plotkin et al.

(10) Patent No.: US 7,617,541 B2
(45) Date of Patent: Nov. 10, 2009

(54) METHOD AND/OR SYSTEM TO AUTHORIZE ACCESS TO STORED DATA

(75) Inventors: Serge Plotkin, San Carlos, CA (US); Hristo Bojinov, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 718 days.

(21) Appl. No.: 11/223,890

(22) Filed: Sep. 9, 2005

(65) Prior Publication Data

US 2007/0057048 A1 Mar. 15, 2007

(51) Int. Cl.
*G06F 7/04* (2006.01)

(52) U.S. Cl. ............................................. 726/27; 707/9

(58) Field of Classification Search ...................... 726/2, 726/21, 27, 28, 30; 707/9, 10; 713/165, 713/166, 167, 182
See application file for complete search history.

(56) References Cited

U.S. PATENT DOCUMENTS

| | | | | |
|---|---|---|---|---|
| 6,175,924 | B1 * | 1/2001 | Arnold | 713/189 |
| 6,606,690 | B2 * | 8/2003 | Padovano | 711/148 |
| 6,993,661 | B1 | 1/2006 | Garfinkel | |
| 7,318,093 | B2 * | 1/2008 | Touboul | 709/223 |
| 2002/0156984 | A1 * | 10/2002 | Padovano | 711/148 |
| 2003/0037248 | A1 | 2/2003 | Launchbury et al. | |
| 2003/0229779 | A1 * | 12/2003 | Morais et al. | 713/153 |
| 2004/0054770 | A1 * | 3/2004 | Touboul | 709/223 |
| 2004/0153642 | A1 | 8/2004 | Plotkin et al. | |
| 2005/0033988 | A1 | 2/2005 | Chandrashekhar et al. | |
| 2005/0041812 | A1 | 2/2005 | Sundararajan et al. | |
| 2005/0080761 | A1 | 4/2005 | Sundararajan et al. | |
| 2005/0102498 | A1 | 5/2005 | Hristo et al. | |
| 2005/0114429 | A1 * | 5/2005 | Caccavale | 709/200 |
| 2005/0171983 | A1 * | 8/2005 | Deo et al. | 707/202 |
| 2005/0238175 | A1 | 10/2005 | Plotkin et al. | |

OTHER PUBLICATIONS

Decru, Inc., "Decru Datafort™ Storage Security Appliances", © 2004, 2 pages.
Decru, Inc., "Decru Datafort™ E-Series Storage Security Appliances—Transparent Data Security for Network Attached Storage (NAS)", © 2004, 2 pages.
Decru, Inc., "Decru Datafort FC-Series Storage Security Appliances—Comprehensive Security for Storage Area Networks and Tape Backup", © 2004, 2 pages.
U.S. Appl. No. 11/223,444, filed Sep. 9, 2005, Serge Plotkin.
U.S. Appl. No. 11/222,684, filed Sep. 8, 2005, Serge Plotkin.
U.S. Appl. No. 11/223,445, filed Sep. 9, 2005, Serge Plotkin.
U.S. Appl. No. 11/223,443, filed Sep. 9, 2005, Serge Plotkin.

* cited by examiner

*Primary Examiner*—Beemnet W Dada
(74) *Attorney, Agent, or Firm*—Cesari and McKenna, LLP

(57) ABSTRACT

Embodiments of methods and/or systems to authorize access to stored data are disclosed.

12 Claims, 5 Drawing Sheets

METHOD AND/OR SYSTEM TO AUTHORIZE ACCESS TO STORED DATA

BACKGROUND

This disclosure is related to management of and/or authorization to access stored data.

One difficulty with state of the art technology relates to the ability to manage authorization for accessing data that has been stored, such as on a computing platform and/or on a storage area network, for example. Stored data may be maintained in an encrypted format which may be decrypted for use by an authorized client and/or authorized consumer of the stored data. Authorization to access stored data is typically based at least in part on an authentication process to verify and/or confirm an identity of an entity desiring access to the stored data.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

Figure 1:
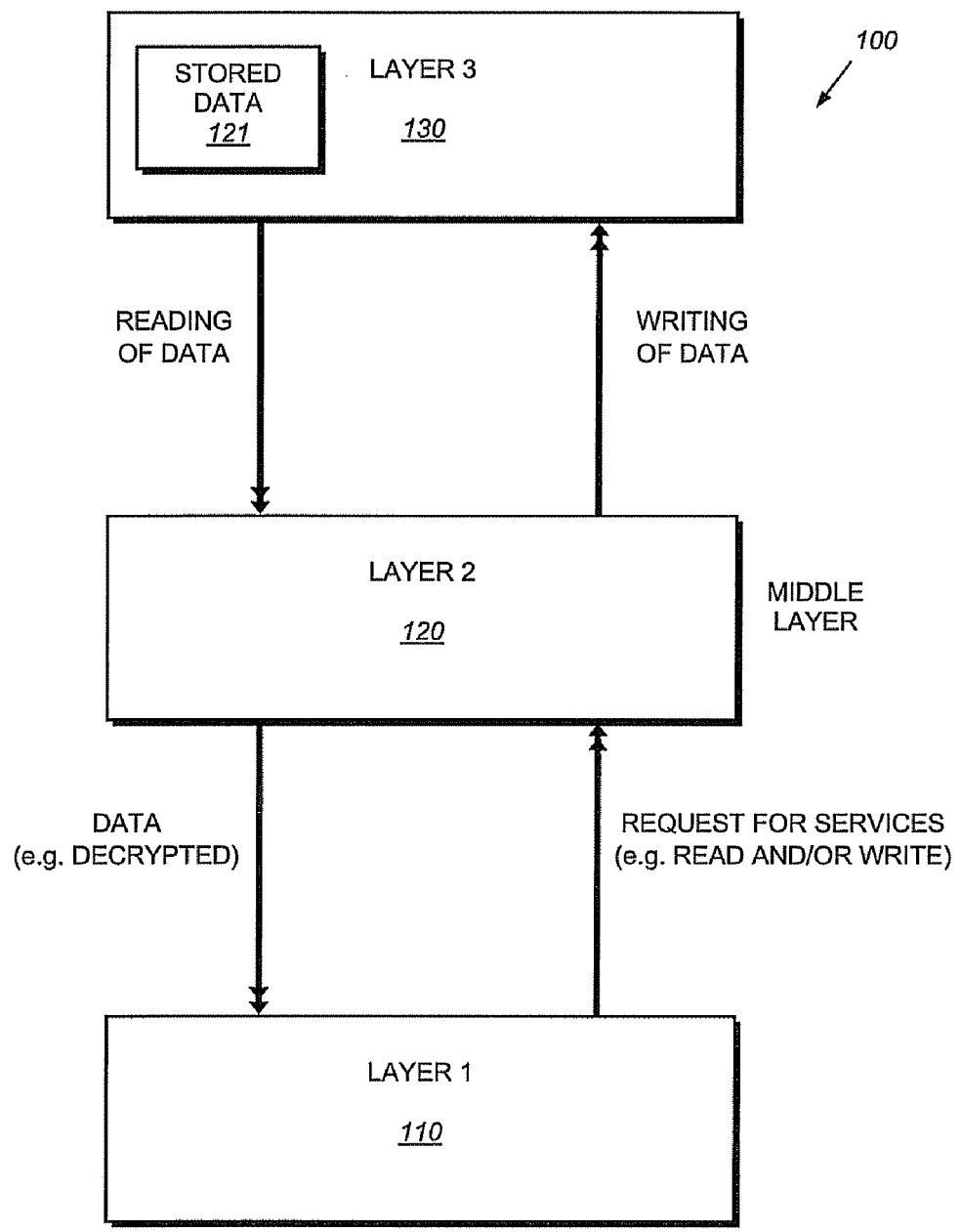
FIG. 1 is a schematic diagram illustrating an embodiment of a system to authorize access to stored data.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

As pointed out above, one difficulty with state of the art technology, particularly in networking, for example, includes the possibility for an unauthorized entity and/or individual to gain access to data that may be stored on and/or processed by one or more computing platforms. A need, therefore, exists for techniques and/or systems to may make it more difficult for unauthorized intruders to gain access to such data.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

"Instructions" as referred to herein relate to expressions which represent one or more logical operations. For example, instructions may be "machine-readable" by being interpretable by a machine for executing one or more operations on one or more data objects, such as, for example, a processor. However, this is merely an example of instructions and claimed subject matter is not limited in this respect. In another example, instructions as referred to herein may relate to encoded commands which are executable by a processor or other processing circuit having a command set which includes the encoded commands. Such an instruction may be encoded in the form of a machine language understood by the processor or processing circuit. Again, these are merely examples of an instruction and claimed subject matter is not limited in these respects.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical and/or semiconductor storage media. However, these are merely examples of a storage medium and claimed subject matter is not limited in these respects.

"Logic" as referred to herein relates to structure for performing one or more logical operations. For example, logic may comprise circuitry which provides one or more output signals based at least in part on one or more input signals. Such circuitry may comprise a finite state machine which receives a digital input signal and provides a digital output signal, or circuitry which provides one or more analog output signals in response to one or more analog input signals. Such circuitry may be provided, for example, in an application specific integrated circuit (ASIC) and/or a field programmable gate array (FPGA). Also, logic may comprise machine-readable instructions stored in a storage medium in combination with a processor or other processing circuitry to execute such machine-readable instructions. However, these are merely examples of structures which may provide logic and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "querying," "obtaining," "hosting," "maintaining," "representing," "modifying," "receiving," "transmitting," "storing," "authenticating," "authorizing," "hosting," "determining" and/or the like refer to the actions and/or processes that may be performed by a computing platform, such as a computer or a similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system or a device that includes the ability to process and/or store data in the form of signals. Thus, a computing platform, in this context, may comprise hardware, software, firmware and/or any combination thereof. Further, unless specifically stated otherwise, a process as described herein, with reference to flow diagrams or otherwise, may also be executed and/or controlled, in whole or in part, by a computing platform.

A "computer program" as referred to herein relates to an organized list of instructions that, if executed, results in or causes a computer, computing device and/or machine to behave in a particular manner. Here, for example, a computer program may comprise machine-readable instructions that are executable to perform one or more desired tasks. In one particular embodiment, although claimed subject matter is not limited in this respect, a computer program may define input data and output data such that execution of the program may provide output data based, at least in part, on the input data. However, these are merely examples of a computer program and claimed subject matter is not limited in these respects.

An "application" as referred to herein relates to a computer program or group of computer programs capable of providing a result and/or action. In a particular embodiment, for example, such an application may comprise a program that performs desired tasks in support of an enterprise, although claimed subject matter is not limited in this respect. For example, an application may comprise one or more end-user programs, such as database programs, spreadsheet programs, word processor program, programs that are accessible through a network browser, electronic mail, interactive games, video and/or image processing programs, calendars, financial application software, inventory control systems and/or the like. However, these are merely examples of an application and claimed subject matter is not limited in these respects.

A "user" as referred to herein relates to an individual and/or entity comprising an identity and is capable of receiving and/or employing a resource. In one particular embodiment, although claimed subject matter is not limited in this respect, a user may comprise an individual in an organization and/or enterprise that is capable of interacting with applications hosted by information services, enabled with one or more computing platforms for example, provided to individuals in the organization and/or enterprise. In an alternative embodiment, a user may comprise a system, computing platform, application and/or other type of entity capable of interacting with such applications. However, these are merely examples of a user and claimed subject matter is not limited in this respect.

"Stored data" as referred to herein relates to information stored in a storage medium in some retrievable format. In a particular example, a "data storage system" may maintain stored data on one or more storage mediums such as, as identified above, magnetic disk, magnetic tape, and/or semiconductor devices in a format that is retrievable in response to requests and/or commands. In one particular embodiment, a data storage system may define a file structure that identifies one or more portions of stored data by a file name according to a file and/or directory structure. Alternatively, a data storage system may define a data block structure that associates stored data with one or more locations on a storage medium. However, these are merely examples of how a data storage system may maintain stored data in a retrievable format and claimed subject matter is not limited in this respect.

According to an embodiment, a user and/or application may "access" stored data maintained by a data storage system by interacting with the data storage system in some manner. Here, for example, a user and/or application may access stored data by issuing a command and/or request to a data storage system maintaining the stored data. Such an access may include, for example, a retrieval of one or more portions of stored data in response to a read command from a user and/or application. Such access may also include a modification, erasure and/or addition to one or more portions of stored data in response to a write command from a user and/or application. However, these are merely examples of how a user and/or application may access stored data maintained by a data storage system and claimed subject matter is not limited in these respects.

"Authentication" as referred to herein relates to a process of verifying an identity of an individual and/or entity. Such an identity may be authenticated using any one of several methods such as, for example, comparing an individual's physical appearance with a government issued picture identification document, comparing a username and password entered in a computer system to pre-stored information, comparing provided information with unique known identification information, comparing information from a portable electronic device to a known sequence of numbers, and/or comparing a biometric specimen and/or sample with a biometric signature. However, these are merely examples of methods that may be used for authentication and claimed subject matter is not limited in these respects.

While authentication may verify an identity of an individual and/or entity, such authentication may not necessarily, by itself, determine whether a particular individual and/or entity should have access to a resource, according to a security policy, for example. "Authorization" as referred to herein relates to a process of granting and/or denying a User and/or application, for example, access to a resource. In one particular embodiment, although claimed subject matter is not limited in this respect, an authorization process may determine whether a user and/or application is to have access to stored data and/or portion thereof according to a predetermined policy, typically after successful authentication. However, this is merely an example of an authorization process and claimed subject matter is not limited in this respect.

An "agent" as referred to herein relates to a process that executes on a first device and is capable of communicating with a second device over a network or independently of a network. In one particular embodiment, for example, an agent process may collect information, such as information associated with the first device, a user of the first device and/or program(s) executing on the first device, for example, and enable transmission of the collected information to the second device. In another embodiment, an agent may receive control signals from the second device to take some action in connection with the first device. However, these are merely examples of how an agent may enable communication between devices and claimed subject matter is not limited in these respects.

FIG. 1 is a schematic diagram illustrating an embodiment 100 of a typical architecture in which an embodiment of a technique to control access to stored data is employed, although claimed subject matter is not limited in scope to this particular architecture or embodiment. In this particular embodiment, FIG. 1 includes a first layer 110, a second layer 120 and a third layer 130. Thus, for this particular embodiment, first layer 110 may make a request for services, such as that data be written and/or read. Second layer 120 may receive the request and may then fulfill it, assuming, for example, that it is able to do so. There are a variety of services that may be provided by second layer 120. Frequently such services are data-related, such as authentication, authorization, and/or data storage and/or retrieval, although these are just examples.

In this particular approach, second layer 120 may supplement and/or enhance services that may be available from third layer 130. One service that might be provided by second layer 120 includes security. For example, this may include firewall functionality, such as packet filtering, packet inspection (e.g., stateful and/or stateless), packet format validation, terminating IPSec connections, and/or the like. Another service that might be provided includes data encryption and/or decryption. Without loss of generality, in this context, encryption includes a process in which data is coded so that the content of the data is not capable of being employed and/or understood by a person and/or a device without first being decoded back to the previous form or format it had prior to being encrypted. Thus, decryption, in this context, includes a process of decoding encrypted data back to the form or format it had prior to encryption.

Thus, in this particular example, if first layer 110 requests that data be written, second layer 120 may encrypt the data to be written. The data, once encrypted, may be stored by or at a third layer, such as 130. This is illustrated in FIG. 1 by 121. Likewise, second layer 120 may, upon another request for services by first layer 110, such as a read request, retrieve the stored, encrypted data from layer three, decrypt it, and provide it to first layer 110. One potential advantage of an embodiment, such as previously described, is that encryption and/or decryption of the data may be made transparent to third layer 130, although it is not necessary that this be the case, even for this embodiment and, thus, claimed subject matter is not limited in scope to embodiments where this is so. Likewise, although claimed subject matter is not limited in scope in this respect, encryption may be also made transparent to first layer 110, e.g., a "consumer" of the services. Likewise, in another embodiment, any two layers, such as first layer 110 and third layer 130, may reside on the same computing platform and even comprise the same layer in some embodiments, although claimed subject matter is not limited in scope in this respect, of course. Also, in other embodiments, any of first layer 110, second layer 120 and/or third layer 130 may reside on multiple computing platforms.

Nonetheless, for such an embodiment, encryption and/or decryption of data stored at or on third layer 130 may not impact operation of layer 130. In this example embodiment, layer 130 may treat data substantially the same regardless of whether or not the data is encrypted. This may provide some benefits, such as making interoperability with other systems possible. Of course, this is just one example of an embodiment of a technique for managing retention and/or discarding of stored data and, as previously stated, claimed subject matter is not limited in scope to such an embodiment.

As previously pointed out, one disadvantage of state of the art technology is the ability or potential ability, for an unauthorized entity and/or individual to gain access to data stored on and/or being processed, such as may occur in networking, for example. In this context, networking is typically implemented using at least two computing platforms. Data storage systems may be designed to serve multiple users in, for a particular example, an enterprise and/or organization. Such data storage systems may be coupled to a network, enabling users to access stored data using standard and/or proprietary communication protocols, for example. An enterprise and/or organization may attempt to control access to data stored in a data storage system according to a security policy. Among other techniques, data transmitted to and/or received from data storage systems over a network may be encrypted as previously described, for example.

A user may be associated with a computing platform hosting one or more applications capable of accessing data stored in a data storage system connected or coupled to the computing platform over a network. In a particular embodiment, data retrieved from a data storage system may be encrypted prior to transmission to a client computing platform in response to a read request, for example. The transmitted data may then be decrypted prior to use by an application. Similarly, data which is to be stored by an application to a data storage system may be maintained on a host computing platform in an unencrypted state prior to encryption for transmission to the data storage system for storage. Accordingly, a computing platform may maintain data received from a secure data storage system and/or data to be stored in a data storage system in an unencrypted state for use by applications.

In addition to applications installed by a user and/or enterprise, a computing platform may host one or more malicious applications that may be capable of accessing unencrypted data. Such malicious applications may include, for example, viruses, worms and/or spyware, just to name a few. According to an embodiment, authorization to access stored data in data storage system may be based, at least in part, on access being granted external to the secure data storage system. Malicious applications, for example, that are not among applications that are authorized to access stored data, accordingly, may be prevented from such access or at least the ability to access stored data may be affected. However, this is merely an example embodiment and claimed subject matter is not limited in this respect.

Figure 2:
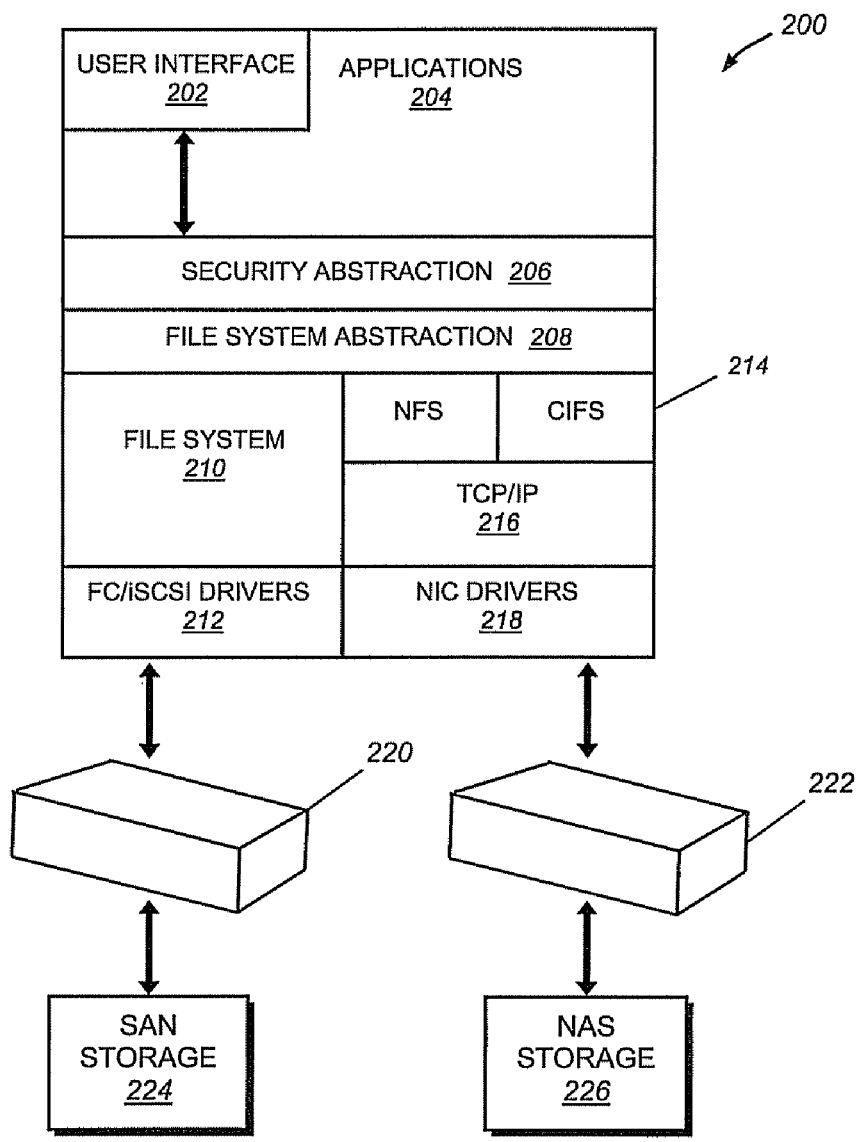
FIG. 2 is a schematic diagram of an embodiment of a set of executable processes that may be used to access stored data.

FIG. 2 is a schematic diagram of an embodiment 200 of a set of executable processes that may be used to access stored data. As illustrate, for convenience, a communication stack may be depicted as a plurality of abstraction layers. However, it should be understood that this is merely one particular technique of illustrating such executable processes, and that processes may be described or illustrated with more abstraction layers or fewer abstraction layers. In a particular embodiment, although claimed subject matter is not limited in this respect, processes 200 may be hosted on a computing platform that are associated with a user and/or hosts one or more applications 204. Here, for example, a user may interact with applications 204 through a user interface 202, such as, for example, a graphical user interface. However this is merely an example of an interface through which a user may interact with applications hosted on a computing platform and claimed subject matter is not limited in this respect.

According to an embodiment, an application may access stored data maintained in a data storage system according to any one of a host of retrievable formats. In a particular embodiment, an application 204 may access stored data maintained in a block based format, as employed in a storage area network (SAN) 224, for example. Here, for example, an application 204 may access data stored in SAN 224 over a network using communication protocols such as, for example, Fibre Channel and/or Internet Small Computer System Interface (iSCSI), for example. As such, a file system abstraction layer 210 may translate between files understood by an accessing application and storage blocks, for example. Of course, any one of a host of other protocols now known or to be developed may be employed either alternatively or in addition. A block based type format may be employed in other embodiments, for example. Drivers at layer 212 may then format data for transmission according to an appropriate block based communication protocol and/or extract stored data from storage blocks received from SAN 224, in this particular embodiment, for example.

In another example, an application may access stored data maintained in a file based format as employed in network attached storage (NAS) 226. Here, for example, an application 204 may access data stored in NAS 226 as files (e.g., as shared files) using communication protocols, such as, for example, packet based protocols, such as Ethernet described in versions of IEEE Std. 802.3. Of course, any one of a host of other protocols now known or to be developed may be employed either alternatively or in addition. A file based type format may be employed in other embodiments, for example.

However, continuing with this particular example, NIC drivers 218 and transmission control protocol (TCP)/Internet Protocol (IP) layer 216 may pack and unpack data files in data packets transmitted between NAS 226 and a computing platform, in this particular embodiment, for example. NAS 226 may maintain stored data according to any one of a variety of file systems, such as, for example, a network file system (NFS) promoted by Sun Microsystems Inc. or a Common Internet File System (CIFS), to name two examples of a format for storing data according to a file system. Accordingly, layer 216 may format access requests to NAS 226 according to an NFS and/or CIFS in this particular embodiment.

According to an embodiment, although claimed subject matter is not limited in this respect, a computing platform may access data stored in SAN 224 and/or NAS 226 through corresponding appliances 220 and/or 222. In a particular embodiment, although claimed subject matter is not limited in this respect, appliances 220 and/or 224 may perform encryption and/or decryption operations in connection with transmitting data between a user's computing platform and SAN 224 and/or NAS 226, depending, for example, on the particular system implementation. Here, for example, appliances 220 and/or 222 may receive requests from a computing platform, including data to be stored in a data storage system as part of such a request, for example, for data, in an un-encrypted or an encrypt data format, that is to be transferred to a data storage system such as, for example, data that is to be stored in connection with an access request. Also, an appliance 220 or 222 may decrypt data that is received from a data storage system, such as stored data that is retrieved in response to a read request. Decrypted data may then be formatted for use by a requesting application, for example.

As illustrated above, data may be transmitted between a computing platform and a data storage system using communication protocols that format data into units of frames, blocks and/or packets. Such units may be formatted to comprise a header portion including, for example, a source and/or destination address and/or identifier, and a payload portion containing data that is to be transported between an application 204 and data storage system, for example. In a particular embodiment, although claimed subject matter is not limited in this respect, payload portions of data transmitted in data packets and/or frames may be encrypted and/or decrypted, as described previously, while a header portion may remain unencrypted. However, this is merely an example of how encrypted data may be formatted for transmission in a network and claimed subject matter is not limited in these respects.

Also, in another particular embodiment, appliances such as 220 and/or 222, for example, may control access to stored data based, at least in part, on one or more criteria. Appliances 220 and/or 222 may receive requests to access data stored by SAN 224 and/or NAS 226, such as, for example, requests to retrieve and/or read stored data, and/or requests to store and/or modify stored data. In one embodiment, such requests may be associated with users initiating requests at a computing platform through, for example, a user interface, such as user interface 202. For example, a request received at an appliance 220 and/or 222 may include information identifying a user, an IP address of a host computing platform originating the request and/or the like. Appliance 220 and/or 222 may selectively authorize access to stored data by granting and/or denying an access request based, at least in part, on information identifying a user originating the request, for example.

According to an embodiment, appliance 220 and/or 222 may identify one or more portions of data stored in SAN 224 and/or NAS 226, for example, as "secured data" to which access may be controlled according to a security policy, for example. In a particular example, although claimed subject matter is not limited in this respect, appliance 220 and/or 222 may also maintain an access control list (ACL) specifying users that are authorized to access particular secured data portions stored in SAN 224 and/or NAS 226. Further, for any particular user and/or secured data portion, for example, such an ACL may further specify a type of access that is authorized (e.g., authorization for read access, but not write access, as an example). Accordingly, in response to a request from a user to access secured stored data, appliances 220 and/or 222, for example, may compare information representative of the user with entries in an ACL to determine whether such access by the user is authorized, in one particular embodiment.

According to a particular embodiment, appliance 220 and/or 222 may also employ authentication of a user prior to granting access to stored data. Here, for example, an appliance 220 and/or 222 may authenticate a user communication, for example, verifying a user identification and/or password received from a computing platform. Upon authenticating a user, appliances 220 and/or 222, for example, may enable the user to access stored data subject to other criteria such as, for example, criteria set forth in an ACL, for example, as previously described.

In addition to and/or in conjunction with security operations described previously in connection with appliances 220 and/or 222, a security abstraction layer 206 may also attempt to control access to stored data by one or more applications 204 and/or users, such as through user interface 202, for example. In alternative embodiments, encryption and/or decryption of data transmitted between a data storage system and a computing platform may be performed within or by security abstraction layer 206 rather than by an appliance 220 and/or 222, as previously described.

In particular embodiments, security abstraction layer 206 may selectively authorize an application 204 and/or user to access stored data according to a security policy. Here, for example, security abstraction layer 206 may employ one or more rules according to such a security policy in determining whether such an access to stored data is to be authorized. As illustrated above, for example, an application and/or user may access stored data through a read and/or write request. In a particular example, although claimed subject matter is not limited in these respects, security abstraction layer 206 may selectively authorize such a read and/or write access to stored data based, at least in part, on a particular application issuing a request for read and/or write access. In one embodiment, although claimed subject matter is not limited in this respect, security abstraction layer may maintain and/or refer to an ACL stored by a computing platform to identify applications, for example, which may be authorized to access stored data maintained by a data storage system (e.g., SAN 224 and/or NAS 226). Also, a request to access stored data may comprise information identifying a particular application. Upon receipt of such a request from an application, such as 204, for example, security abstraction layer 206 may compare information identifying an application originating the request with information in an ACL to determine whether the requested access is authorized. However, this is merely an example of how a request to access stored data may be authorized based, at least in part, on an application requesting access and claimed subject matter is not limited in these respects.

In other embodiments, such an ACL accessible by security abstraction layer 206 may further identify specific portions of stored data maintained by a data storage system comprising secured data, and associate such secured portions with applications which may be authorized to access such specific secured portions. Here, accordingly, security abstraction layer 206 may selectively authorize a request from an application 204 to access a secured portion of stored based, at least in part, on a comparison of identifying information, as indicated by information in the request, for example, with information in the ACL associated with the secured stored data. If a requesting application is among authorized applications, for example, for the requested secured data, as indicated, in this embodiment, by the ACL, for example, security abstraction layer 206 may authorize the request. Also, as illustrated above, for any particular user and/or secured data portion, such an ACL accessible by security abstraction layer 206 may further specify a type of access that is authorized (e.g., authorization for read access, but not write access, as an example).

By comparing identifying information, such as an application originating a request, for example, with entries in an ACL, and using this comparison to determine whether the requesting application, for example, is among authorized applications, malicious applications making similar requests, for example, may be denied access or at least their ability to access secure data may be reduced. Accordingly, security abstraction layer 206 may selectively authorize requests to access stored data based, at least in part, on a particular application requesting access to the stored data.

In other embodiments, security abstraction layer 206 may authorize access to stored data based at last in part upon other information in addition to, or in lieu of, information about the request for access to the stored data, such as, for example, whether an particular request originator is authorized. For example, security abstraction layer 206 may authorize access to stored data based, at least in part, on a variety of potential considerations, including, for example, a time at which access may be requested (e.g., time of day and/or day of week, as examples), a user that may be associated with a request to access the stored data, any other information that may be determined or determinable at the time the access is made or is to occur, and/or any combinations thereof.

According to an embodiment, although claimed subject matter is not limited in this respect, security abstraction layer 206, for example, may be used in conjunction with other processes for accessing stored data (e.g., file system abstraction layer 208, file system layer 210, FC/iSCSI drivers 212, NFS/CIFS layer 2214, TCP/IP layer 216 and/or NIC drivers 218, for this particular embodiment). It should be understood, of course, that, in particular embodiments, a computing platform may be configured to access stored data with or without security abstraction layer 206.

Likewise, security abstraction layer 206 may also be employed in combination with an appliance, such as 220 and/or 222, for example, to control access to stored data from applications 204, for this particular embodiment. In one particular embodiment, security abstraction layer 206 may further comprise an agent of an appliance 220 and/or 222 hosted on a computing platform that also hosts one or more applications, for example. As illustrated above in connection with a particular embodiment, security abstraction layer 206 may authorize a request to access stored data based, at least in part, on an application attempting to access the stored data. For unauthorized requests to access data (e.g., from an application 204 that is not identified as an authorized application according to an ACL, for example), security abstraction layer 206 may prevent or otherwise interfere with such requests from being transmitted from the computing platform hosting the requesting application, in this example, to a data storage system.

As illustrated above, requests to access stored data from an application 204 may be transmitted to an appliance, such as 220 and/or 222, for example, to be forwarded to an associated data storage system. According to an embodiment, although claimed subject matter is not limited in this respect, security abstraction layer 206 may comprise an agent of an appliance 220 and/or 222 that is hosted on a computing platform capable of accessing stored data through an appliance, such as 220 and/or 222. For example, an appliance, such as, for example, 220 and/or 222, adapted to forward requests for accessing data from a computing platform may be further adapted to prevent or otherwise interfere with the forwarding of such requests, after determining that an associated security abstraction layer 206 is not hosted on the computing platform, for example.

According to an embodiment, requests to access stored data received at an appliance 220 and/or 222 may comprise information identifying a source of the request. For example, a message transmitting a request to an appliance 220 and/or 222 for accessing stored data may comprise information such as, for example, a handle associated with a user originating the request, an Internet Protocol address and/or other information that is indicative of a computing platform that originated the request. Upon receipt of such a message transmitting such a request, accordingly, an appliance 220 and/or 222 may determine whether to grant access to stored data based, at least in part, on whether the message originated from a computing platform known to be hosting security abstraction layer 206.

Figure 3:
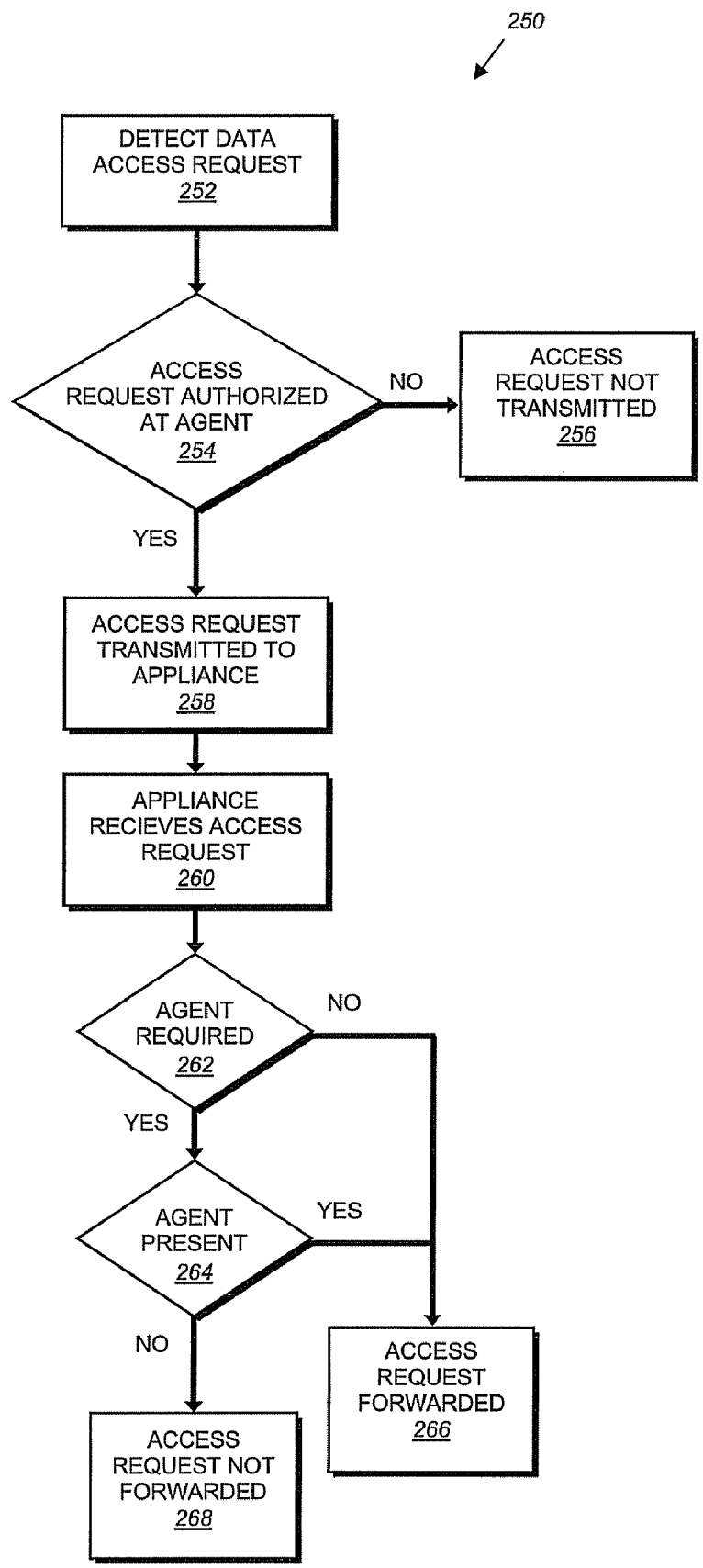
FIG. 3 is a flow diagram of a process to determine whether access requests are to be transmitted to a data storage system according to an embodiment.

FIG. 3 illustrates a process to determine whether an access request is to be forwarded to a data storage system according to an embodiment. A request to access stored data is detected at block 252 by, for example, an agent such as an agent comprising security abstraction layer 206. At diamond 254, an agent, such as an agent hosted on a computing platform hosting applications initiating the data access request or on an intermediate device and/or computing platform as illustrated herein, may determine whether the data access request is to be authorized as illustrated above. As illustrated above, such an agent may employ one or more rules, such as rules according to a security policy for example, to determine whether the access request should be authorized such as, for example, any one or a combination of the application that is requesting access, a user ID, time of day and/or the like. The agent may then allow transmission of the detected access request to an appliance such as an appliance 220 and/or 222 at block 258 if such data access is authorized at diamond 254.

Upon receipt of a data access request at block 260, at an appliance 220 and/or 222 for example, diamond 262 may determine whether the presence of an agent is required for forwarding the received data access request to a data storage system. Here, for example, diamond 262 may consider a number of factors to determine whether such an agent is required including, for example, whether the appliance is to be configured with an agent hosted on a computing platform as an optional feature as illustrated below and/or according to a security policy. Regarding security policy factors, for example, diamond 262 may consider the particular data to which access is being requested (e.g., by file name and/or location), time of day, a machine from which the received data access request originated, a user associated originating the received data access request, a size of the affected data (e.g., number of megabytes to be read and/or written according to the request) and/or statistics associated with data access. However, these are merely examples of security policy factors that may be considered by diamond 262 in determining whether hosting of an agent is required for allowing forwarding of a data access request and claimed subject matter is not limited in these respects. Regarding statistics associated with data access, for example, diamond 262 may determine a quantity of data to which access has been requested over a period, (e.g., over a twelve and/or twenty-four hour period) and apply a threshold amount to this quantity (e.g., 100 MB) to determine whether an agent is to be required for future access. However, these are merely examples of how diamond 262 may determine whether a data access request should be forwarded based, at least in part, on statistical information and claimed subject matter is not limited in these respects. If no such agent is required as determined at diamond 262, block 266 may forward the received data access request to a data storage system.

At diamond 264, an appliance such as 220 and/or 222, for example, may selectively forward a data request received at block 260 to a data storage system based, at least in part, on whether an associated agent, such as an agent comprising security abstraction layer 206 is hosted on a computing platform, as illustrated in greater detail below according to a particular embodiment. Here, an appliance 220 and/or 222 may receive a request from a computing platform to access data from a data storage system at block 252. If the agent is present, block 266 may forward the request to a data storage system. If the agent is absent, block 268 may obstruct and/or prevent the request from being forwarded to the data storage system.

In addition to determining whether an agent is present at 264, an appliance such as appliance 220 and/or 222 may also apply additional logic to determine whether the received data access request should be forwarded to a data storage system according to a security policy, for example. As illustrated above, for example, such an appliance may selectively enable forwarding of the received data access request to a data storage system based, at least in part, on whether such data access is authorized according to an ACL, for example.

Figure 4:
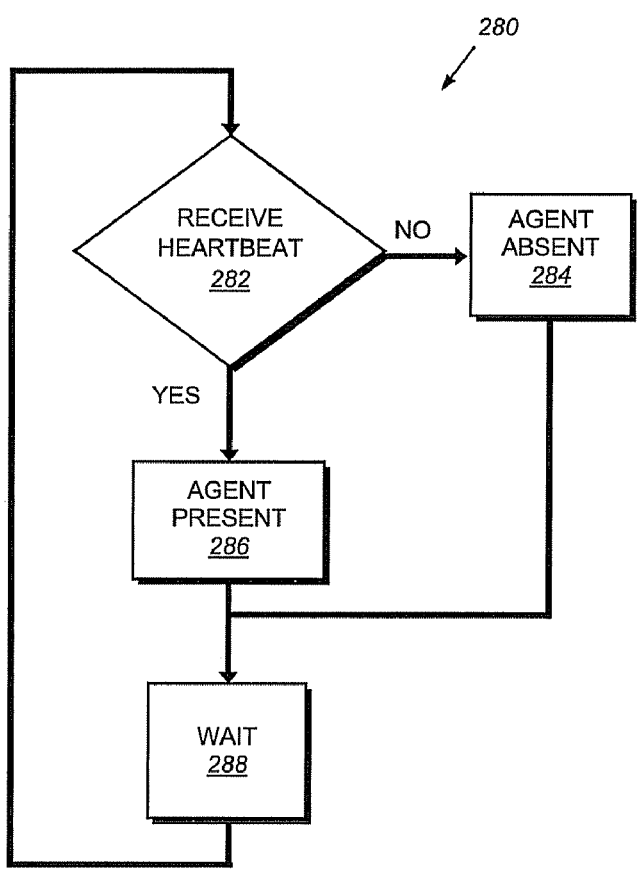
FIG. 4 is a flow diagram of a process to determine whether an agent is hosted on a computing platform according to an embodiment.

FIG. 4 illustrates a process to determine whether an agent, such as an agent comprising data abstraction layer 206, is present on a computing according to a particular embodiment. Logic at diamond 282, such as logic at an appliance 220 and/or 222, may determine the presence of a "heartbeat" signal from, for example, a computing platform transmitting a data access request. In this context, a heartbeat refers to sufficiently frequent or regular communications within a particular or configurable period of time so as to communicate to the appliance that an agent is hosted on a computing platform as illustrated above. Here, for example, such a heartbeat received at an appliance 220 and/or 222 may comprise, for example, a periodic transmission of information. If a heartbeat is received as determined at diamond 282, block 286 may conclude that an agent is hosted on a computing platform. Otherwise, if the heartbeat is not received, block 284 may conclude that an agent is not hosted on a computing platform. Block 288 may then wait for a particular duration, such as a duration determined based, at least in part, on a known frequency of the heartbeat, to check for the presence of the heartbeat again at diamond 282.

In some embodiments, a heartbeat may comprise a periodic transmission of information such as, for example, a cryptographic symbol marker and/or tag in a data packet payload. In particular embodiments, such a heartbeat may be transmitted in an out-of-band protocol as illustrated below in greater detail. In other embodiments, such a heartbeat may comprises a periodic signal transmitted over a physical communication channel in any one of several types of data transmission media such as, for example, a radio frequency transmission medium, twisted wire pair cable, optical transmission cable, to name a few. Of course, many other additional approaches are possible and included within the scope of claimed subject matter.

In an alternative to determining a presence of an agent as illustrated in FIG. 4, upon receipt of a request to access stored data directed to an appliance, such as 220 and/or 222, for example, from a computing platform, the appliance may transmit a query message to the requesting computing platform to determine whether a security abstraction layer 206, for example, in this particular embodiment, as an agent, is hosted on the computing platform. If the computing platform does not respond to the query message with an indication that the security abstraction layer 206 is hosted on the requesting computing platform, the appliance may prevent or interfere with forwarding of the request, for example, as previously described. In a particular embodiment, such a query and any response to such a query may also be transmitted in an out-of-band protocol described below. Of course, claimed subject matter is not limited in scope to these particular examples or embodiments.

According to an embodiment, an agent comprising security abstraction layer 206 may comprise a computer program that may be optionally and/or selectively installed for use in combination with an appliance 220 and/or 222. In one particular embodiment, such an agent may be hosted on a computing platform that also hosts applications that are accessible by users to request access to stored data through an appliance 220 and/or 222 as illustrated in FIG. 2. As such, actions performed by security abstraction layer 206 as illustrated herein may be performed by such a computing platform hosting such applications. In alternative embodiments, such an agent may be hosted on an intermediate device and/or computing platform coupled between a computing platform hosting applications requesting access to stored data and an appliance 220 and/or 222. Here, accordingly, actions performed by security abstraction layer 206 as described herein may be performed by such an intermediate device and/or computing platform.

As illustrated above, an appliance 220 and/or 222 may be configured to prevent or otherwise interfere with requests to access stored data based, at least in part, on whether security abstraction layer 206 is hosted on a computing platform originating the requests. Having security abstraction layer 206 as a separately installable feature (e.g., as a separately installable computer program), therefore, an appliance 220 and/or 222 may be selectively configured to enable access to stored data from computing platforms that do not have the installed feature. In a particular embodiment, such information may be used, for example, in determining at diamond 262 whether a presence of an agent is to be required before forwarding a data access request. Here, for example, an administrator may selectively configure appliance 220 and/or 222 to (e.g., via an administrative HTML interface and/or control panel) to either obstruct and/or prevent such access to stored data in the absence of the installed feature or enable such access regardless of whether the feature is installed. Accordingly, the administrator may have flexibility in configuring appliance 220 and/or 222 to either require installation of the feature on a computing platform originating a request for such access or not require such installation of the feature on a computing platform originating a request for such access.

As illustrated above, according to particular embodiments, stored data and/or requests for accessing such stored data may be communicated in a variety of manners, including in accordance with communication protocols for accessing stored data in a retrievable format, for example. In one particular embodiment, although claimed subject matter is not limited in this respect, messages for transmitting requests according to such communication protocols may include and/or accompany information to indicate that the messages originated from a computing platform hosting security abstraction layer 206. Such information may include, for example, a tag, symbol and/or marker embedded in a request message that indicates a presence of the security abstraction layer 206 on the computing platform originating the request message. Here, accordingly, an appliance 220 and/or 222 may selectively authorize and/or enable forwarding of such requests based, at least in part, on such information indicating whether the request originated from such a computing platform.

As illustrated above, stored data and/or requests for accessing such stored data may be communicated in accordance with communication protocols for accessing stored data in a retrievable format. According to an alternative embodiment, however, security abstraction layer 206 may communicate with an appliance, such as 220 and/or 222 using an "out-of-band" protocol that is distinct from such communication protocols that may be used for accessing data in a retrievable format. Such an out-of-band protocol may comprise a protocol that capable of transmitting information in Internet Protocol (IP) packets on the same or different transmission medium as used for transmitting information according to the aforementioned protocols for accessing stored data in a retrievable format. Such an out-of-band protocol may include, for example, a simple network management protocol (SNMP) or other IP based protocol. In alternative embodiments, such an out-of-band-protocol may comprise other types of IP based protocols including, for example, other secure and/or proprietary protocols. Here, such a secure out-of-band protocol may transmit information in encrypted payloads and/or using a payload format that is proprietary and/or secure. Using such a secure payload, for example, may prevent tampering and/or spoofing of communication in the out-of-band protocol.

While claimed subject matter is not limited in this respect, such an out-of-band protocol may comprise any one of a host of possible protocols, including protocols now known or to be developed. An out-of-band protocol may be used for transmission over a data link, such as an Ethernet data link, for example. As illustrated above according to particular embodiments, an appliance 220 and/or 222 may be configurable to either require or not require installation of security abstraction layer 206 on a computing platform to enable the computing platform to access data stored on data storage system 224 and/or 226. By using such an out-of-band protocol to determine a presence and/or absence of security abstraction layer 206 on a computing platform (e.g., detecting a presence of a heartbeat and/or through exchange of query and response messages as illustrated above), for example, there is no need to modify communication protocols to be used for enabling access when security abstraction layer 206 is not installed. Additionally, using a secure out-of-band protocol as illustrated above may provide additional security to prevent spoofing and/or tampering so that it appears to an appliance 220 and/or 222 that security abstraction layer 206 is present on a computing platform when it is in fact absent.

Figure 5:
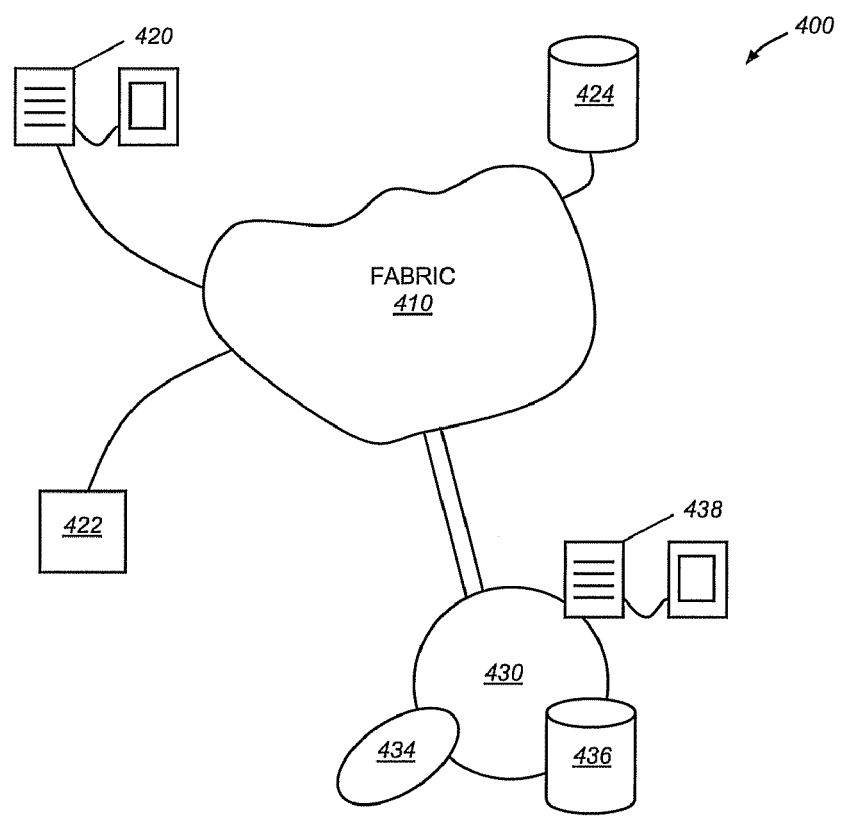
FIG. 5 is a schematic diagram of an example embodiment of a communications network or system.

FIG. 5 is a schematic diagram of an example embodiment of a communications network or system 400 that may employ an embodiment in accordance with claimed subject matter. In this example, embodiment 600 comprises a switched fabric 410 and a plurality of devices, such as 420, 422, 424, and/or groups of devices, such as 434, 436, and 438, as indicated with respect to logical loop 130, for example. References to "a switch" or to "switches" are intended to refer to a generic switch. In this context, then, the term switch refers to a device that includes a processor and memory and that is adapted to or has the capability to route frames or packets between two or more separate devices. In general, a switched fabric, such as fabric 410, may be communicatively coupled to various devices, such as, here, 420, 422, and 424, and may operate as a switching network to allow these devices to communicate with each other. Devices 420, 422, and 424 may comprise any type of device, such as, for example, a computing platform, a storage device, and/or the like, and may be communicatively coupled via fabric 410 by employing point-to-point communications technology or techniques, as one example. In this particular embodiment, fabric 410 comprises a variety of communicatively coupled switches. In this particular embodiment fabric 410 is also in communication with logical loop 430. Loop 430 here includes devices 434, 436 and 438. In this particular embodiment, loop 430 comprises an arbitrated loop with ring couplings for providing multiple nodes with the ability to arbitrate access to shared bandwidth. It is, of course, appreciated that this particular embodiment is merely an illustrative example and claimed subject matter is not limited in scope in any way to this particular embodiment.

The following discussion details several possible embodiments for accomplishing this, although these are merely examples and are not intended to limit the scope of claimed subject matter. As another example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example. It will, of course, be understood that, although particular embodiments have just been described, claimed subject matter is not limited in scope to a particular embodiment or implementation.

In the preceding description, various aspects of claimed subject matter have been described. For purposes of explanation, systems and configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method comprising:
   detecting a data access request by an agent executing on a first device by a processor;
   determining, by the agent, whether the data access request is authorized based on at least one rule associated with a security policy on the first device;
   in response to the agent determining that the data access request is authorized, transmitting the data access request to a second device;
   determining, by an application executing on the second device, whether the presence of an agent on the first device is required to forward the data access request to a data storage system, wherein the determination is based on statistical information associated with data access of the data storage system;
   in response to determining that the presence of the agent is required, determining whether the agent is present, the presence of the agent determined by detection of a heartbeat signal being received at the second device from the first device; and
   in response to determining the agent is present, forwarding the data.

2. The method of claim 1, and further comprising:
   hosting said application on a computing platform associated with an entity; and
   authenticating said entity.

3. The method of claim 1, wherein said determining, by the agent, whether the data access request is authorized comprises selectively authorizing access based, at least in part, on at least one of a time of said access or a time of a request for access.

4. The method of claim 1, and wherein said determining, by the agent, whether the data access request is authorized further comprises:
   comparing information identifying said application with an access control list; and selectively transmitting said request to access said stored data to said storage system based at least in part on the comparison.

5. The method of claim 4, wherein said transmitting said request comprises transmitting said request via a security appliance external to said storage system.

6. The method of claim 1, and further comprising transmitting stored data between said data storage system and an external computing platform according to a communication protocol for transmitting data stored according to a retrievable format, and further comprising selectively transmitting an access request to said storage system based, at least in part, on information transmitted between said external computing platform and said data storage via a communication protocol other than said communication protocol for transmitting stored data.

7. The method of claim 6, wherein said communication protocol other than said communication protocol for transmitting stored data comprises an out of band protocol.

8. The method of claim 1, wherein said application is hosted on a computing platform, said method further comprising selectively enabling said access based, at least in part, on a presence of an agent hosted on said computing platform.

9. A system comprising:
   (a) a first device in a computer network, the first device executing an agent by a first processor, the agent configured to:
      detect a data access request,
      determine whether the data access request is authorized based on at least one rule associated with a first security policy, and
      transmit the data access request to a second device in response to the determination that the data access request is authorized; and
   (b) a second device in the computer network, the second device executing an application by a second processor, the application configured to:
      determine whether the presence of an agent is required on the first device to forward the data access request to a data storage system, the requirement of the agent based on statistical information associated with data access of the data storage system,
      determine whether the agent is present, the presence of the agent determined by detection of a heartbeat signal being received at the second device from the first device in response to the determination that the presence of the agent is required, and
      authorize the data access request to be forwarded to the data storage system in response to the determination that the agent is present.

10. The system of claim 9, wherein said second device is configurable to enable said access in an absence of said agent on said device.

11. The system of claim 10, wherein said agent comprises selectively installable computer program, and wherein said second device is configured to enable access if said computer program is not installed on said first device.

12. The system of claim 9, wherein said first and second devices are configured to transmit stored data between one another according to a communication protocol for transmission of data stored according to a retrievable format, and wherein said second device is further configured to determine whether said agent is hosted on said first device based, at least in part, on information transmitted between said first and second computing platforms via a communication protocol other than said communication protocol for transmission of stored data.

* * * * *

UNITED STATES PATENT AND TRADEMARK OFFICE
CERTIFICATE OF CORRECTION

PATENT NO. : 7,617,541 B2  Page 1 of 1
APPLICATION NO. : 11/223890
DATED : November 10, 2009
INVENTOR(S) : Plotkin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 996 days.

Signed and Sealed this

Nineteenth Day of October, 2010

David J. Kappos
*Director of the United States Patent and Trademark Office*